United States Patent
Nishida

(10) Patent No.: US 9,447,718 B2
(45) Date of Patent: Sep. 20, 2016

(54) VEHICLE CONTROL DEVICE

(71) Applicant: TOYOTA JIDOSHA KABUSHIKI KAISHA, Toyota-shi, Aichi-ken (JP)

(72) Inventor: Tsuneyoshi Nishida, Nissin (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/754,844

(22) Filed: Jun. 30, 2015

(65) Prior Publication Data

US 2016/0003355 A1 Jan. 7, 2016

(30) Foreign Application Priority Data

Jul. 1, 2014 (JP) .................................. 2014-136101

(51) Int. Cl.
  *F01P 3/20* (2006.01)
  *F01P 5/12* (2006.01)
  *F01P 7/14* (2006.01)

(52) U.S. Cl.
  CPC .. *F01P 5/12* (2013.01); *F01P 3/20* (2013.01); *F01P 7/14* (2013.01); *B60W 2510/0638* (2013.01); *B60W 2510/0657* (2013.01); *B60W 2510/0666* (2013.01)

(58) Field of Classification Search
  None
  See application file for complete search history.

(56) References Cited

U.S. PATENT DOCUMENTS 5,852,995 A * 12/1998 Aoki ...................... B60H 1/038
  123/142.5 R
2015/0128567 A1* 5/2015 Kondo .................. F01N 3/2033
  60/274

FOREIGN PATENT DOCUMENTS

| JP | 11-190237 | 7/1999 |
| JP | 11-223152 | 8/1999 |
| JP | 2001-289046 | 10/2001 |
| JP | 2013-177947 | 9/2013 |

* cited by examiner

*Primary Examiner* — Justin Holmes
(74) *Attorney, Agent, or Firm* — Finnegan, Henderson, Farabow, Garrett & Dunner, LLP

(57) ABSTRACT

There is provided a control device for a vehicle including: an engine; a water pump driven by the engine to circulate engine cooling water, and a transmission that changes a speed of rotation transmitted from the engine and transmits the rotation with a changed speed to drive wheels. A speed ratio of the transmission may be changed by a manual operation. The control device includes at least one electronic control unit configured to: i) execute output control of the engine in response to an accelerator pedal operation performed by a driver; and ii) control the engine such that an output of the engine When a condition that a cooling capacity for cooling the engine is determined to be insufficient with respect to a load on the engine is satisfied is lower than an output of the engine based on an accelerator operation amount when the condition is not satisfied.

6 Claims, 3 Drawing Sheets

VEHICLE CONTROL DEVICE

INCORPORATION BY REFERENCE

The disclosure of Japanese Patent Application No. 2014-136101 filed on Jul. 1, 2014 including the specification, drawings and abstract is incorporated herein by reference in its entirety.

BACKGROUND OF THE INVENTION

1. Field of the Invention

The invention relates to a vehicle control device for a vehicle provided with a water-cooled engine.

2. Description of Related Art

As the aforementioned vehicle control device, there is a vehicle control device described in Japanese Patent Application Publication No. 2013-477947 (JP 2013-177947 A). When the temperature of cooling water for an engine is high, the vehicle control device described in JP 2013-177947 A forcibly shifts a transmission to a lower gear, thereby increasing the engine speed. Thus, the flow rate of the cooling water discharged from a water pump, which is driven by the engine, is increased to enhance the engine-cooling capacity. This inhibits the cooling water from boiling, thereby inhibiting the engine from overheating.

SUMMARY OF THE INVENTION

However, the vehicle control device according to the foregoing related art forcibly shifts the transmission to a lower gear independently of a driver's operation. Thus, the driver does not expect an increase in the engine speed due to the downshift, and such an unexpected increase in the engine speed may give the driver an uncomfortable feeling.

The invention provides a vehicle control device configured to avoid an excessive increase in the temperature of cooling water in such a manner that a driver is less likely to feel uncomfortable.

An aspect of the invention relates to a control device for a vehicle including an engine, a water pump, and a transmission. The control device includes at least one electronic control unit, The water pump is configured to be driven by the engine to circulate cooling water for cooling the engine. The transmission is configured to change a speed of rotation transmitted from the engine and transmit the rotation with a changed speed to drive wheels. A speed ratio of the transmission is allowed to be changed by a manual operation. The at least one electronic control unit is configured to i) execute output control of the engine in response to an accelerator pedal operation performed by a driver; and ii) control the engine such that an output of the engine when a condition that a cooling capacity for cooling the engine is determined to be insufficient with respect to a load on the engine is satisfied is lower than an output of the engine based on an accelerator operation amount when the condition is not satisfied.

When the driver feels insufficiency of the torque even after depressing the accelerator pedal, the driver performs an operation for increasing the speed ratio of the transmission, that is, a downshift operation. Thus, in the output control executed by the control device, when the condition that the cooling capacity for cooling engine is determined to be insufficient with respect to a load on the engine is satisfied and thus the engine output is reduced, the torque for driving the vehicle is reduced to prompt the driver to perform a downshift operation. When the driver performs a downshift operation to shift the transmission to a lower gear, the engine speed is increased. As a result, the flow rate of the cooling water discharged from the water pump is increased to enhance the cooling capacity for cooling the engine. Because an increase in the engine speed at this time is caused by the downshift operation performed by the driver, the increase in the engine speed does not give the driver an uncomfortable feeling. Thus, with the vehicle control device according to the above aspect, an excessive increase in the temperature of the cooling water is avoided in such a manner that the driver is less likely to feel uncomfortable, When the required load factor of the engine is high, the amount of heat generated by the engine is large. Thus, the condition that the cooling capacity for cooling engine is determined to be insufficient with respect to the load on the engine may include the condition that a required load factor of the engine is higher than a limited load factor. When the engine speed is low, the flow rate of the cooling water discharged from the water pump is low, so that the cooling capacity for cooling the engine becomes more insufficient. Thus, a limited load factor when the engine is operating at low speed may set lower than a limited load factor when the engine is operating at high speed. When the atmospheric pressure is low, the boiling point of the cooling water is low, so that the cooling water is likely to boil. Thus, a limited load factor under a low atmospheric pressure may set lower than a limited load factor under a high atmospheric pressure.

When the driver selects a speed ratio lower than a speed ratio suitable for the current traveling states of the vehicle as the speed ratio of the transmission, the engine is operated at a speed lower than expected and under a load higher than expected. Thus, the condition that the cooling capacity for cooling engine is determined to be insufficient with respect to the load on the engine may include a condition that a currently selected speed ratio is lower than a reference speed ratio determined based on a current vehicle traveling state, or may include a condition that a currently selected gear is higher than a reference gear that is determined based on a current vehicle traveling state.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
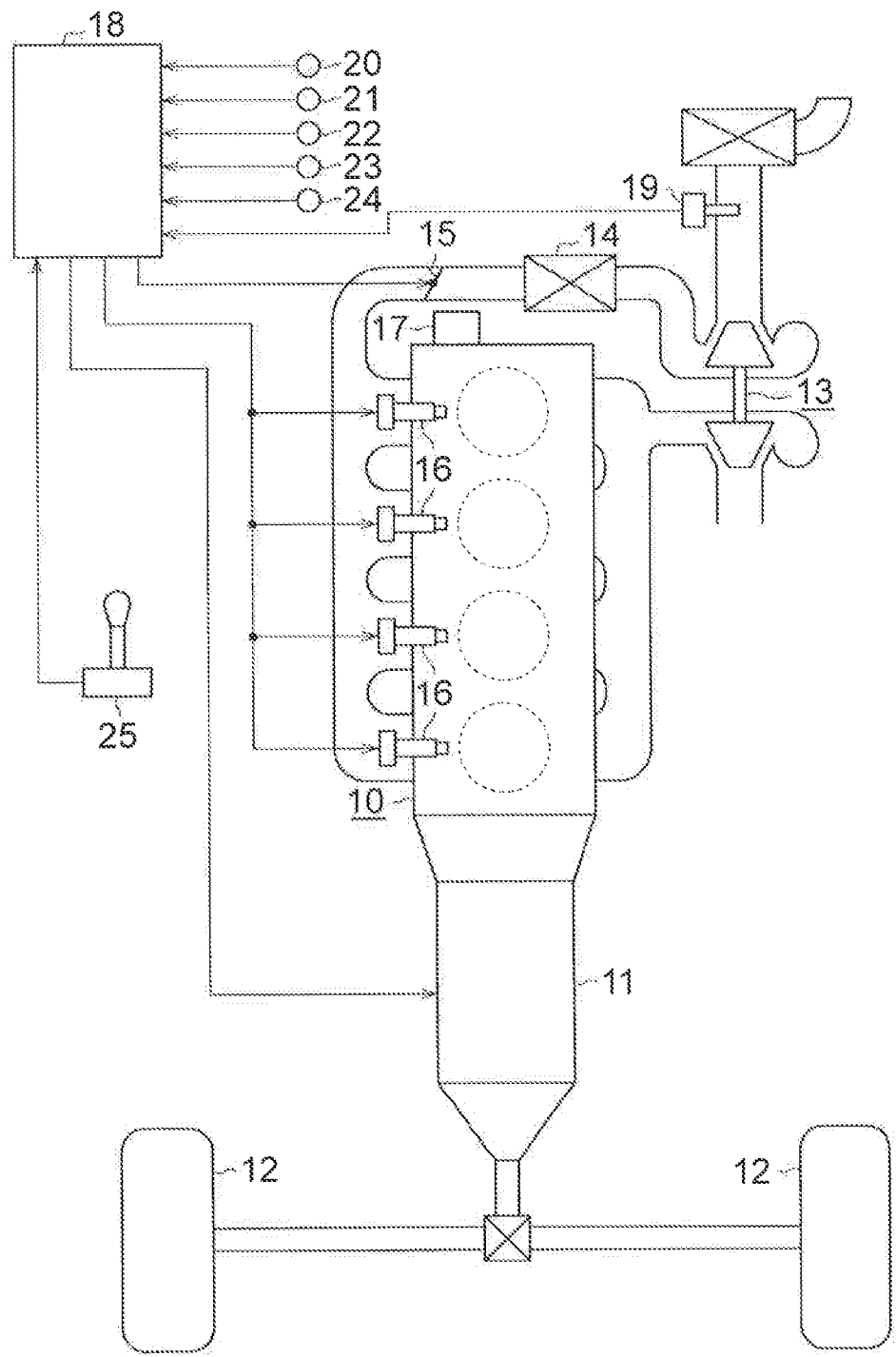
FIG. 1 is a view schematically illustrating the overall structure of a vehicle provided with a vehicle control device according to an embodiment of the invention.

Hereinafter, a vehicle control device according to an embodiment of the invention will be described in detail with reference to FIG. 1 to FIG. 3. As illustrated in FIG. 1, an engine 10 of a vehicle provided with the vehicle control device according to the present embodiment is connected to drive wheels 12 via an automatic transmission 11 to turn the drive wheels 12. The speed of rotation transmitted from the engine 10 is changed by the automatic transmission 11, and then the rotation with a changed speed is transmitted to the drive wheels 12. The automatic transmission 11 mounted in the vehicle is a stepped automatic transmission configured to select a gear to be used from among a plurality of gears that differ from each other in gear ratio (speed ratio), thereby changing gear ratios in a stepwise manner.

The engine 10 includes a turbocharger 13, an intercooler 14, a throttle valve 15, and injectors 16. The turbocharger 13 compresses the air to be supplied for combustion that takes place in the engine 10, and the intercooler 14 cook the compressed air. The throttle valve 15 regulates the amount of air to be supplied as the combustion air, and the injectors 16 inject fuel into the air to be supplied as the combustion air.

The engine 10 is provided with a water pump 17. The water pump 17 is driven by the engine 10 to circulate cooling water for cooling the engine 10. Specifically, the water pump 17 is provided with a rotary shaft that is rotatably connected to a crankshaft, which is an output shaft of the engine 10, via a belt or the like. The water pump 17 is configured to pressurize and discharge the cooling water as the rotary shaft of the water pump 17 rotates in accordance with the rotation of the crankshaft. Thus, the cooling water circulates through water jackets formed in the engine 10 and a radiator to alternately receive heat from the engine 10 and dissipate the heat in the radiator, thereby cooling the engine 10. The flow rate (discharge flow rate) of the cooling water discharged from the water pump 17 correlates with the speed of the engine 10 (engine speed NE), so that the discharge flow rate increases with an increase in the engine speed NE.

The vehicle described above is controlled by an electronic control unit 18. The electronic control unit 18 is connected to various sensors disposed in various locations of the vehicle, such as an air flow meter 19, a crank sensor 20, an accelerator pedal sensor 21, a vehicle speed sensor 22, an atmospheric pressure sensor 23, and a water temperature sensor 24. The air flow meter 19 detects an amount of air to be supplied for combustion that takes place in the engine 10 (intake air amount GA), and the crank sensor 20 detects a rotational phase of the engine 10 (crank angle). The accelerator pedal sensor 21 detects an amount by which a driver depresses an accelerator pedal (accelerator operation amount ACCP), and the vehicle speed sensor 22 detects a traveling speed of the vehicle (vehicle speed SPD). The atmospheric pressure sensor 23 detects an atmospheric pressure PA, and the water temperature sensor 24 detects a temperature of the cooling water (cooling water temperature THW). The electronic control unit 18 acquires a current engine speed NE by executing computation based on the detection result obtained by the crank sensor 20.

In addition, a shift lever device 25 is connected to the electronic control unit 18. The shift lever device 25 transmits the information on an operation position of a shift lever selected by the driver, to the electronic control unit 18. The shift lever device 25 has a drive position and a manual position as the operation positions for the shift lever. When the shift lever has been operated to the drive position, the electronic control unit 18 controls the automatic transmission 11 in an automatic gear change mode. At this time, gears of the automatic transmission 11 are automatically changed based on the traveling states of the vehicle (such as the vehicle speed SPD, and the accelerator operation amount ACCP). On the other hand, when the shift lever has been operated to the manual position, the electronic control unit 18 controls the automatic transmission 11 in a manual gear change mode. At this time, the automatic transmission 11 is shifted to a higher gear or a lower gear in response to a driver's upshift operation or downshift operation, as long as, for example, a condition that the engine speed NE is within an allowable range is satisfied.

The electronic control unit 18 controls the output of the engine 10 (executes the output control of the engine 10) as part of vehicle control. The output control is executed basically in the following manner. In the output control of the engine 10, the electronic control unit 18 first computes a required load factor, which is a required value of a load factor of the engine 10, based on the accelerator operation amount ACCP and the current operating states of the engine 10 (such as the engine speed NE). The load factor is a ratio of the current intake air amount GA to the intake air amount to be achieved when the throttle valve 15 is fully opened in a normal aspiration state at the current engine speed NE The electronic control unit 18 controls the throttle valve 15 to adjust the intake air amount GA so that the load factor of the engine 10 becomes the required load factor. Further, the electronic control unit 18 controls the amount of fuel to be injected from each of the injectors 16 based on the intake air amount GA, thereby adjusting the magnitude of the output of the engine 10 to a magnitude suitable for the current operating state.

In the vehicle described above, when the following conditions are satisfied at the same time, it is difficult to ensure a cooling capacity sufficient to remove the heat generated by the engine 10. The conditions include: (i) a condition that the vehicle is traveling at a high altitude; (ii) a condition that the vehicle is towing, for example, a guided vehicle so that the total vehicle weight is increased; and (iii) a condition that a driver selects a gear higher than the gear suitable for the current traveling states of the vehicle, that is, a gear having a gear ratio lower than the gear ratio suitable for the current traveling states of the vehicle, in the manual gear change mode.

At a high altitude, the atmospheric pressure is lower than that under normal circumstances, so that the boiling point of the cooling water is lower than that under normal circumstances. As a result, overheating of the engine 10 occurs at a cooling water temperature THW that is lower than that under normal circumstances. When the total vehicle weight is increased, the engine load increases accordingly and thus the heat generated by the engine 10 increases. When a gear higher than the gear suitable for the current traveling states is selected, the engine load further increases and thus the heat generated by the engine 10 further increases, and the engine speed NE decreases and thus the flow rate of the cooling water discharged from the water pump 17 decreases. As a result, the cooling capacity for cooling the engine 10 is reduced.

In normally-aspirated engines, when the atmospheric pressure is low, the engine load does not increase, and thus the cooling capacity is less likely to be insufficient. On the other hand, in turbocharged engines such as the engine 10, even when the atmospheric pressure is low, turbocharging increases the engine load, and thus the cooling capacity may become insufficient under some traveling states of the vehicle.

When the state where the cooling capacity is insufficient continues for a long time, the cooling water temperature may increase to cause boiling of the cooling water, resulting in overheating of the engine 10. In view of this, the vehicle control device according to the present embodiment executes the output control of the engine 10 in the following manner. When the vehicle is traveling in a state where the cooling water is likely to boil, the vehicle control device makes the engine output lower than that when the vehicle is traveling in a state where the cooling water is less likely to boil. In this way, an excessive increase in the temperature of the cooling water is avoided.

Figure 2:
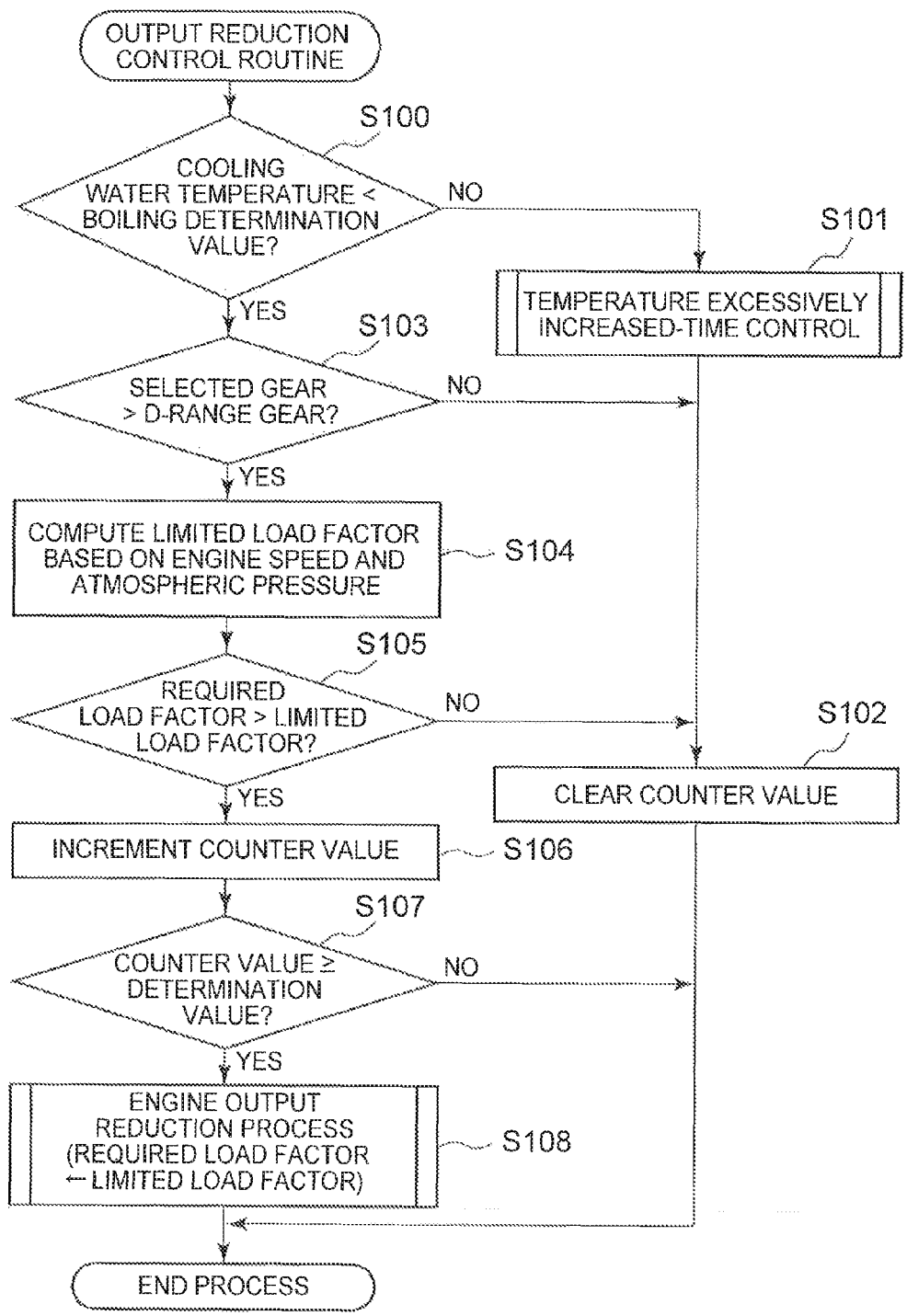
FIG. 2 is a flowchart illustrating the procedure of engine output reduction control routine executed by the vehicle control device.

FIG. 2 illustrates a flowchart of an output reduction control routine for executing the output control as described above. The process in the routine is executed as part of the output control of the engine 10. The process in the routine is executed by the electronic control unit 18 after the required load factor described above is computed and before the required load factor is reflected on the opening control of the throttle valve 15.

Upon start of the process in the routine, the electronic control unit 18 determines in step S100 whether or not the cooling water temperature THW is lower than a prescribed boiling determination value. The boiling determination value is set to a boiling point of the cooling water at the minimum value of expected atmospheric pressures, or a temperature slightly lower than this boiling point. When the cooling water temperature THW is equal to or higher than the boiling determination value (NO in S100), the engine 10 is in an overheating state or is in a state close to the overheating state. In this case, the electronic control unit 18 proceeds on to step S101 in which the electronic control unit 18 executes control, which is executed when the cooling water temperature THW is excessively increased (hereinafter, referred to as "temperature excessively increased-time control"). In the temperature excessively increased-time control, a warning is given to a driver by, for example, illuminating an indicator, and the engine output is reduced to a minimum necessary magnitude of output that allows the vehicle to travel in a limp-home mode. Then, after the value of a counter (described later) is cleared to zero in step S102, the process in the current routine ends.

On the other hand, when the cooling water temperature THW is lower than the boiling determination value (YES in S100), the electronic control unit 18 proceeds on to step S103. In step S103, the electronic control unit 18 determines whether or not the gear selected in the automatic transmission 11 is higher than a D-range gear. The D-range gear is a gear to be selected in the current vehicle traveling states while the automatic transmission 11 is controlled in the automatic gear change mode. In the automatic gear change mode, the selected gear always coincides with the D-range gear and thus a negative determination (NO) is always made in step S103. Hence, an affirmative determination (YES) is made in step S103 when the driver selects a gear higher than the D-range gear by performing a manual operation in the manual gear change mode. In the present embodiment, a gear ratio (speed ratio) of the D-range gear described above corresponds to a reference gear ratio (reference speed ratio) that is determined based on the current traveling states of the vehicle.

When a negative determination (NO) is made in step S103, the electronic control unit 18 proceeds on to step S102 described above. After the value of the counter is cleared to zero in step S102, the process in the current routine ends. On the other hand, when an affirmative determination (YES) is made in step S103, the electronic control unit 18 proceeds on to step S104. In step S104, a limited load factor is computed based on the engine speed NE and the atmospheric pressure PA.

Figure 3:
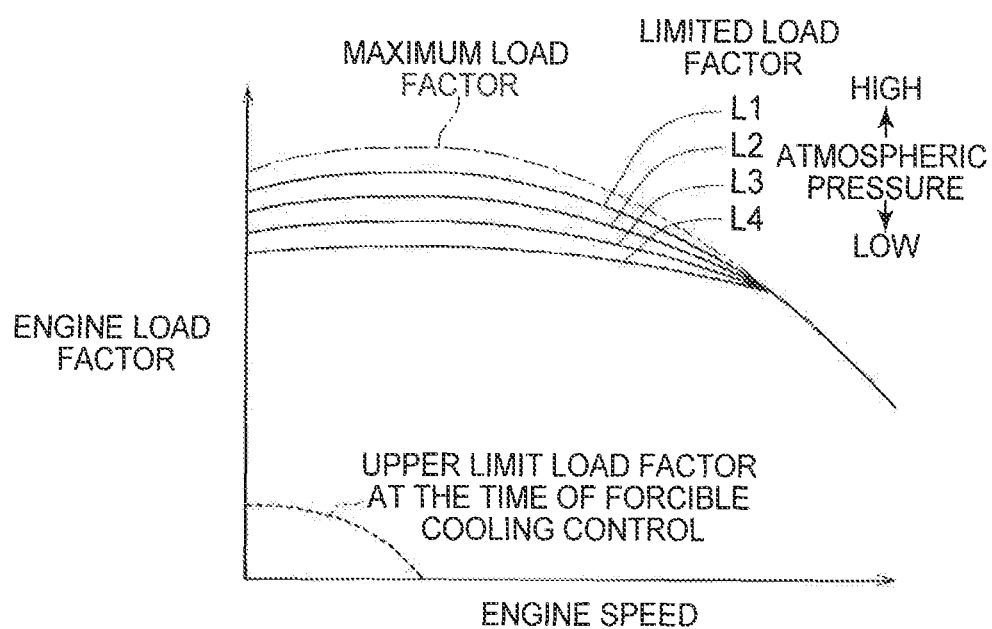
FIG. 3 is a graph illustrating the relationship among the limited load factor computed in the engine output reduction control routine, the engine speed, and the atmospheric pressure.

FIG. 3 illustrates a relationship among the engine speed NE, the atmospheric pressure PA, and the limited load factor. Curves L1 to L4 indicated by solid lines in FIG. 3 represent the relationship between the limited load factor and the engine speed NE at different atmospheric pressures. The curves L1, L2, L3, L4 represent the above-described relationship in descending order of the atmospheric pressure PA. That is, among the curves L1 to L4, the curve L1 represents the above-described relationship at the highest atmospheric pressure PA, and the curve L4 represents the above-described relationship at the lowest atmospheric pressure PA. In addition, a curve indicated by an alternate long and short dash line in FIG. 3 represents the relationship between the engine speed NE and the maximum value of load factor (maximum load factor) of the engine 10, and a curve indicated by a dotted line in FIG. 3 represents the relationship between the engine speed NE and the upper limit value of engine load factor (upper limit load factor) at the time of forcible cooling control.

As illustrated in FIG. 3, each limited load factor is set to a value lower than the maximum load factor when the engine speed is in a low engine speed range, and each limited load factor is set to a value equal to the maximum load factor when the engine speed is in a high engine speed range. That is, the limited load factor when the engine speed is low is set to a value that is lower than the limited load factor when the engine speed is high.

In the case where the engine speed is in the low engine speed range, when the atmospheric pressure PA is low, the limited load factor is set to be lower than that when the atmospheric pressure PA is high. More specifically, as the atmospheric pressure PA is lower, the limited load factor is set to a lower value. Note that, when the current atmospheric pressure PA is the standard atmospheric pressure, that is, the standard atmospheric pressure at sea level, the limited load factor is set to a value equal to the maximum load factor.

After the limited load factor is computed as described above, the electronic control unit 18 proceeds on to step S105. In step S105, the electronic control unit 18 determines whether or not the required load factor computed based on the accelerator operation amount ACCP and the current operating states of the engine 10 as described above is higher than the limited load factor computed in step S104. When the required load factor is equal to or lower than the limited load factor (NO in S105), the electronic control unit 18 proceeds on to step S102 described above. After the value of the counter is cleared to zero in step S102, the process in the current routine ends. In a determination based on a comparison between the required load factor and the limited load factor in step S105, it is determined whether or not the cooling capacity for cooling the engine 10 is insufficient with respect to the load on the engine 10.

On the other hand, when the required load factor exceeds the limited load factor, an affirmative determination (YES) is made in step S105. This means that the atmospheric pressure is lower than the standard atmospheric pressure, a gear higher than the D-range gear is selected in the automatic transmission 11, and the engine 10 is operated at low speed and under high load. That is, the vehicle is traveling in a state where the cooling water is likely to boil. In this case, the electronic control unit 18 proceeds on to step S106. In step S106, the value of the counter is incremented. The value of the counter indicates a duration of time for which the vehicle keeps traveling in the state where the cooling water is likely to boil.

When the value of the counter is incremented, the electronic control unit 18 proceeds on to step S107. In step S107, the electronic control unit 18 determines whether or not the value of the counter is equal to or higher than a prescribed determination value for executing an engine output reduction process. That is, in step S107, the electronic control unit 18 determines whether or not the vehicle keeps traveling in the state where the cooling water is likely to boil for a prescribed duration of time or longer.

When the value of the counter is lower than the determination value (NO in S107), the process in the current routine ends. On the other hand, when the value of the counter is equal to or higher than the determination value (YES in S107), the electronic control unit 18 proceeds on to step S108. In step S108, the engine output reduction process for making the engine output lower than that under the normal circumstances is executed. The engine output reduction process in the vehicle control device is executed by updating the required load factor to the limited load factor computed in step S104. That is, when the engine output reduction process is executed, the upper limit of the required load factor is limited by the limited load factor (the limited load factor functions as a guard value for the upper limit of the required load factor). After the engine output reduction process is executed, the process in the current routine ends.

Next, the effects of execution of the engine output reduction control on the operating states of the engine 10 will be described. When the vehicle is traveling under a low atmospheric pressure, for example, travelling at a high altitude, with a gear higher than the D-range gear selected in the manual gear change mode, the cooling water is likely to boil due to a combination of a decrease in the boiling point of the cooling water under the low atmospheric pressure, an increase in the heat generated by the operation of the engine 10 under high load, and a decrease in the flow rate of the cooling water discharged from the water pump 17 due to the operation of the engine 10 at low speed. With the vehicle control device according to the present embodiment, when the operation of the engine 10 in the above-described state continues for a prescribed duration of time or longer, the engine output is made lower than that under normal circumstances by executing the engine output reduction control.

When the engine output is reduced as described above, even if a driver depresses the accelerator pedal by a large amount, the torque for driving the vehicle does not increase largely. When the driver feels insufficiency of the torque, the driver performs a downshift operation. Thus, reduction in the engine output caused by the above-described engine output reduction control prompts the driver to perform a downshift operation. When the driver actually performs the downshift operation, the engine speed NE increases so that the flow rate of the cooling water discharged from the water pump 17 is increased. As a result, the cooling capacity for cooling the engine 10 is enhanced. In addition, the engine load decreases, and thus the heat generated by the engine 10 decreases. As a result, an excessive increase in the temperature of the cooling water is avoided.

Because an increase in the engine speed NE at this time is caused by the downshift operation performed by the driver, the increase in the engine speed NE does not give the driver an uncomfortable feeling. Thus, an excessive increase in the temperature of the cooling water is avoided in such a manner that the driver is less likely to feel uncomfortable. As described above, execution of the engine output reduction control prompts the driver to perform the operation for avoiding an increase in the temperature of the cooling water (downshift operation) before the temperature of the cooling water increases up to the boiling point determination value at which the temperature excessively increased-time control needs to be executed.

The vehicle control device according to the present embodiment produces the following advantageous effects.

1) According to the present embodiment, the following process is executed in the output control of the engine 10 that is executed in response to an operation of the accelerator pedal performed by a driver. When a condition that the cooling capacity for cooling the engine 10 is determined to be insufficient with respect to a load on the engine 10 is satisfied, the engine output is made lower than that when the condition is not satisfied at the same accelerator operation amount ACCP as that when the condition is satisfied. Thus, the driver is prompted to perform a downshift operation by which the engine speed NE is increased to avoid an excessive increase in the temperature of the cooling water. Because such an increase in the engine speed NE resulting from the above-described prompting control is caused by the operation performed by the driver, the increase in the engine speed NE does not give the driver an uncomfortable feeling. As a result, an excessive increase in the temperature of the cooling water is avoided in such a manner that the driver is less likely to feel uncomfortable.

2) According to the present embodiment, the condition that the required load factor exceeds the limited load factor needs to be satisfied to satisfy the condition that the cooling capacity for cooling the engine 10 is determined to be insufficient with respect to a load on the engine 10. In addition, the limited load factor when the engine speed is low is set to a value that is lower than the limited load factor when the engine speed is high. When the engine 10 is operating at low speed and under high load, the amount of heat generated by the engine 10 is large but the flow rate of the cooling water discharged from the water pump 17 is low, so that the cooling water is likely to boil. Thus, by determining whether or not the condition that the engine 10 continues to operate at low speed and under high load is satisfied, it is possible to accurately determine whether or not the vehicle is traveling in a state where the cooling water is likely to boil. In this way, the engine output reduction process is executed under appropriate situations.

3) According to the present embodiment, under the standard atmospheric pressure, the limited load factor is set to a value equal to the maximum load factor, so that the required load factor does not exceed the limited load factor. On the other hand, when the atmospheric pressure is lower than the standard atmospheric pressure, the limited load factor in the low engine speed range is set to a value lower than the maximum load factor, so that the required load factor may exceed the limited load factor. According to the present embodiment, when the condition that the atmospheric pressure PA is lower than the standard atmospheric pressure is satisfied, the electronic control unit 18 determines that the vehicle is traveling in a state where the cooling water is likely to boil and executes the engine output reduction process. As the atmospheric pressure PA decreases, the boiling point of the cooling water decreases, so that the cooling water is more likely to boil. Thus, by accurately determining whether or not the vehicle is traveling in a state where the cooling water is likely to boil, the engine output reduction process is executed under appropriate situations.

4) According to the present embodiment, the condition that gear higher than the D-range gear, which is determined based on the current traveling states of the vehicle, is selected needs to be satisfied to satisfy the condition that the cooling capacity for cooling the engine 10 is determined to be insufficient with respect to a load on the engine 10. That is, the condition that a gear selected in the automatic transmission 11 is higher than the reference gear, which is determined based on the current traveling states of the vehicle, (i.e., the condition that a gear ratio (speed ratio) selected in the automatic transmission 11 is lower than the reference gear ratio (reference speed ratio), which is determined based on the current traveling states of the vehicle) needs to be satisfied to satisfy the condition that the cooling capacity for cooling the engine 10 is determined to be insufficient with respect to a load on the engine 10. When the driver selects a gear ratio lower than the reference gear ratio suitable for the current traveling states of the vehicle as the gear ratio of the automatic transmission 11, the engine 10 is operated at a speed lower than expected and under a load higher than expected. Thus, by accurately determining whether or not the vehicle is traveling in a state where the cooling water is likely to boil, the engine output reduction process is executed under appropriate situations.

5) According to the present embodiment, the engine output reduction process is executed when the cooling water temperature THW is lower than the cooling water temperature (boiling determination value) at which the temperature excessively increased-time control is executed. Thus, the driver is prompted to perform an operation for avoiding an increase in the cooling water temperature THW before the cooling water temperature THW increases up to the boiling point determination value at which the temperature excessively increased-time control needs to be executed.

The foregoing embodiment may be modified as described below. In the foregoing embodiment, as the temperature excessively increased-time control, which is executed when the cooling water temperature THW increases up to the boiling determination value, the control of reducing the engine output to the minimum necessary magnitude of output that allows the vehicle to travel in the limp-home mode is executed. However, the temperature excessively increased-time control may be executed in a manner different from the above-described manner. For example, as the temperature excessively increased-time control, only a warning may be given to the driver without executing the engine output reduction process.

The engine output reduction control in the foregoing embodiment may be applied to a vehicle provided with a manual transmission. In this case, a determination in step S103 of the output reduction control routine in FIG. 2 is made by comparing the currently selected gear with a gear suitable for the current traveling states (such as the vehicle speed SPD and the accelerator operation amount ACCP), which is acquired based on the current traveling states.

The engine output reduction control in the foregoing embodiment may be applied to a vehicle provided with a continuously variable transmission. In this case, a determination in step S103 of the output reduction control routine in FIG. 2 is made by comparing the speed ratio currently selected by the continuously variable transmission with a speed ratio suitable for the current traveling states (such as the vehicle speed SPD and the accelerator operation amount ACCP), which is acquired based on the current traveling states.

In the foregoing embodiment, the condition that a gear selected in the transmission is higher than the reference gear, which is determined based on the current traveling states of the vehicle, (i.e., the condition that a gear ratio (speed ratio) selected in the transmission is lower than the reference gear ratio (reference speed ratio), which is determined based on the current traveling states of the vehicle) needs to be satisfied to satisfy the condition that the cooling capacity for cooling the engine 10 is determined to be insufficient with respect to a load on the engine 10. In the case where the cooling capacity for cooling the engine 10 may be insufficient in some traveling states of the vehicle even when the reference gear is selected in the transmission, a determination in step S103 of the engine output reduction control routine in FIG. 2 may be omitted, so that the engine output reduction process is executed independently of a gear ratio (gear) currently selected. That is, the condition regarding the gear ratio (gear) may be removed from conditions that need to be satisfied to satisfy the condition that the cooling capacity for cooling the engine 10 is determined to be insufficient with respect to a load on the engine 10.

According to the foregoing embodiment, the limited load factor in the low engine speed range is set to a lower value as the atmospheric pressure PA decreases. However, it is not necessary to variably set the limited load factor based on the atmospheric pressure PA. In the case where the limited load factor is not set variably based on the atmospheric pressure PA, by setting the condition that the atmospheric pressure PA is lower than a prescribed value (e.g. the standard atmospheric pressure) as the condition for incrementing the value of the counter in step S106 of the engine output reduction control routine in FIG. 2, the engine output reduction process is executed in an appropriate situation in which the vehicle is traveling in a state where the cooling water is likely to boil due to a low boiling point of the cooling water.

In the case where, even at the standard atmospheric pressure, the cooling capacity for cooling the engine 10 may be insufficient in some traveling states of the vehicle, the engine output reduction process may be executed independently of the atmospheric pressure PA. That is, the condition regarding the atmospheric pressure PA may be removed from conditions that need to be satisfied to satisfy the condition that the vehicle is traveling in a state where the cooling water is likely to boil.

In the foregoing embodiment, the limited load factor when the engine speed is low is set to a value that is lower than the limited load factor when the engine speed is high. However, in the case where the cooling capacity for cooling the engine 10 may be insufficient in some traveling states of the vehicle even when the engine 10 is operating in a manner other than low-speed and high-load operation, for example, even when the engine 10 is operating at high speed and under high load, the manner of setting the limited load factor may be modified such that the engine output reduction control is executed even when the engine is operating in a manner other than low-speed and high-load operation.

In the foregoing embodiment, the engine output reduction control is executed by updating the required load factor to the limited load factor. However, the engine output reduction control may be executed by correcting the required load factor such that the required load factor is reduced. In this case, the correction amount by which the required load factor is reduced may be either a fixed value or a variable value that varies based on, for example, the atmospheric pressure PA and the cooling water temperature THW.

The foregoing embodiment is applied to a vehicle provided with a turbocharged engine. However, the engine output reduction control as described in the foregoing embodiment may be applied to a vehicle provided with a normally-aspirated engine, when the cooling capacity for cooling the normally aspirated engine may be insufficient in some traveling states of the vehicle.

What is claimed is:

1. A control device for a vehicle including an engine, a water pump, and a transmission, the water pump configured to be driven by the engine to circulate cooling water for cooling the engine, the transmission configured to change a speed of rotation transmitted from the engine and transmit the rotation with a changed speed to drive wheels, and a speed ratio of the transmission being allowed to be changed by a manual operation, the control device comprising
at least one electronic control unit configured to:
i) execute output control of the engine in response to an accelerator pedal operation performed by a driver; and
ii) control the engine such that an output of the engine when a condition that a cooling capacity for cooling the engine is determined to be insufficient with respect to a load on the engine is satisfied is lower than an output of the engine based on an accelerator operation amount when the condition is not satisfied.

2. The control device according to claim 1, wherein the condition includes a condition that a required load factor of the engine is higher than a limited load factor.

3. The control device according to claim 2, wherein the electronic control unit is configured to set the limited load factor such that a limited load factor when the engine is operating at low speed is lower than a limited load factor when the engine is operating at high speed.

4. The control device according to claim 2, wherein the electronic control unit is configured to set the limited load factor such that a limited load factor under a low atmospheric pressure is lower than a limited load factor under a high atmospheric pressure.

5. The control device according to claim wherein the condition includes a condition that a currently selected speed ratio is lower than a reference speed ratio determined based on a current vehicle traveling state.

6. The control device according to claim 1, wherein the condition includes a condition that a currently selected gear is higher than a reference gear that is determined based on a current vehicle traveling state.

* * * * *